United States Patent
Ryan et al.

(10) Patent No.: US 12,539,210 B2
(45) Date of Patent: Feb. 3, 2026

(54) TRANSCATHETER AORTIC VALVE SEATING SENSOR

(71) Applicant: MEDTRONIC VASCULAR, INC., Santa Rosa, CA (US)

(72) Inventors: Raymond Ryan, Limerick (IE); Nicholas Fox, Dranmore (IE); John Gallagher, Galway (IE); Timothy Desmond Farrell, Tralee (IE)

(73) Assignee: Medtronic Vascular, Inc., Santa Rosa, CA (US)

( * ) Notice: Subject to any disclaimer, the term of this patent is extended or adjusted under 35 U.S.C. 154(b) by 626 days.

(21) Appl. No.: 18/003,190

(22) PCT Filed: Jun. 28, 2021

(86) PCT No.: PCT/US2021/039304
§ 371 (c)(1),
(2) Date: Dec. 23, 2022

(87) PCT Pub. No.: WO2022/005927
PCT Pub. Date: Jan. 6, 2022

(65) Prior Publication Data
US 2023/0255765 A1    Aug. 17, 2023

Related U.S. Application Data

(60) Provisional application No. 63/045,445, filed on Jun. 29, 2020.

(51) Int. Cl.
*A61F 2/24* (2006.01)
*A61F 2/95* (2013.01)
*A61F 2/966* (2013.01)

(52) U.S. Cl.
CPC ............ *A61F 2/2436* (2013.01); *A61F 2/966* (2013.01); *A61F 2002/9505* (2013.01); *A61F 2002/9665* (2013.01); *A61F 2250/0096* (2013.01)

(58) Field of Classification Search
CPC ................ A61F 2/2436; A61F 2/95–97; A61F 2250/0096; A61F 2002/9505; A61M 25/00
See application file for complete search history.

(56) References Cited

U.S. PATENT DOCUMENTS

| | | | |
|---|---|---|---|
| 2004/0148006 A1 | 7/2004 | Davidson et al. | |
| 2011/0251675 A1 | 10/2011 | Dwork | |

(Continued)

FOREIGN PATENT DOCUMENTS

| | | |
|---|---|---|
| CN | 1391489 A | 1/2003 |
| CN | 104363861 A | 2/2015 |

(Continued)

OTHER PUBLICATIONS

International Search Report mailed Oct. 15, 2021 in Intl Appl. No. PCT/US2021/039304.

(Continued)

*Primary Examiner* — Sarah W Aleman
(74) *Attorney, Agent, or Firm* — Medler Ferro Woodhouse & Mills PLLC

(57) ABSTRACT

A delivery system for delivering a prosthesis includes a spindle for securing a stent to a shaft. The spindle includes at least one pocket for receiving a paddle of the stent. The delivery system also includes at least one sensor positioned within the at least one pocket and configured to detect a presence of the paddle relative to the at least one pocket.

20 Claims, 14 Drawing Sheets

(56) References Cited

U.S. PATENT DOCUMENTS

| | | |
|---|---|---|
| 2011/0264202 A1 | 10/2011 | Murray, III et al. |
| 2012/0078350 A1* | 3/2012 | Wang .................... A61F 2/2436 |
| | | 623/2.11 |
| 2015/0088245 A1* | 3/2015 | Costello .................... A61F 2/95 |
| | | 29/515 |
| 2016/0367368 A1 | 12/2016 | Vidlund et al. |
| 2017/0165063 A1* | 6/2017 | Anderson ............. A61F 2/2427 |
| 2017/0196509 A1 | 7/2017 | Hunter |

FOREIGN PATENT DOCUMENTS

| | | |
|---|---|---|
| WO | 2013155474 A1 | 10/2013 |
| WO | 2016/100799 A1 | 6/2016 |

OTHER PUBLICATIONS

Notice on the First Office Action, CN Application No. 202180044347.4, mailed Jul. 16, 2025.

\* cited by examiner

TRANSCATHETER AORTIC VALVE SEATING SENSOR

FIELD

The present technology is generally related to delivery catheters for percutaneously delivering medical devices.

BACKGROUND

Medical catheters or delivery catheters are commonly used to access vascular and target sites within a body and to perform various functions at the target sites. These devices are adapted to deliver and deploy medical devices such as prosthetic heart valves, stent-grafts, and stents to the target sites in the body. The medical devices typically are releasably carried within a distal region of the delivery catheter in a radially compressed delivery state or configuration as the catheter is navigated to and positioned at the target site. In many cases, such as those involving cardiovascular vessels, the route to the target site may be tortuous and may present conflicting design considerations requiring compromises between dimensions, flexibilities, material selection, operational controls, and the like.

Typically, advancement of a delivery catheter within a patient is monitored fluoroscopically to enable a clinician to manipulate the catheter to steer and guide its distal end through the patient's vasculature to the target site. This tracking requires a distal end of the delivery catheter to be able to navigate safely to the target site through manipulation of a proximal end by the clinician. The delivery catheter desirably will have a low profile or small outer diameter to facilitate navigation through tortuous vasculature. Additionally, prior to implantation, the medical device must be loaded on the delivery catheter. Currently, loading processes require extensive training by the user to identify a mis-load of the medical devices. Due to the complicated steps of the loading procedures, the current loading processes have the potential for a misidentification of mis-loads of the medical devices that can lead to procedure complications. To identify a mis-load, a mis-load check using fluoroscopy is required during every procedure to verify the medical device is correctly loaded on the delivery catheter. This unnecessarily delays procedures and exposes physicians and patient to unnecessary radiation.

SUMMARY

This disclosure generally relates to a prosthesis delivery system that provides feedback indicating proper loading of an implantable medical device and feedback indicating release of the implantable medical device. The prosthesis delivery system includes one or more sensors that are positioned and configured to detect the proper loading of the implantable medical device. The prosthesis delivery system includes one or more sensors that communicate with one or more indicators. The one or more indicators output an indication of proper loading of the implantable medical device.

In one aspect, the present disclosure provides a delivery system for delivering an implantable medical device, e.g., a prosthesis. The delivery system includes a prosthesis retention member or spindle for securing a prosthesis to a shaft. The spindle includes at least one pocket for receiving a retaining member of the prosthesis, e.g., a paddle of a prosthesis stent or frame. The delivery system also includes at least one sensor positioned within the at least one pocket and configured to detect a presence of the prosthesis paddle relative to the at least one pocket.

In another aspect, the present disclosure provides a delivery system for delivering a prosthesis. The delivery system includes a shaft for delivering the prosthesis to a target site. The delivery system also includes a prosthesis retention member or spindle coupled to the shaft for securing a portion off an implantable medical device to the shaft. The spindle includes at least one pocket for receiving a retaining member of the prosthesis, e.g., a paddle of the prosthesis stent or frame. Further, the delivery system includes a sheath covering the retaining member or paddle and the spindle. The sheath is configured to move relative to the shaft. The delivery system includes at least one sensor positioned within at least one pocket and configured to detect a presence of the retaining member or paddle relative to at least one pocket.

In another aspect, the present disclosure provides a method for determining proper loading of an implantable medical device coupled to a prosthesis retention member or spindle of a delivery system. The method includes activating one or more of at least one sensor or at least one indicator. The at least one sensor is positioned within a pocket of the spindle and configured to detect a presence of a paddle of the implantable medical device relative to the pocket. The method also includes, in response to the activation, outputting, via the at least one indicator, an indication of relative position of the paddle to the pocket.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

The foregoing and other features and advantages of the present disclosure will be apparent from the following description of embodiments hereof as illustrated in the accompanying drawings. The accompanying drawings, which are incorporated herein and form a part of the specification, further serve to explain the principles of the present disclosure and to enable a person skilled in the pertinent art to make and use the embodiments of the present disclosure. The drawings are not to scale.

DETAILED DESCRIPTION

Figure 1A:
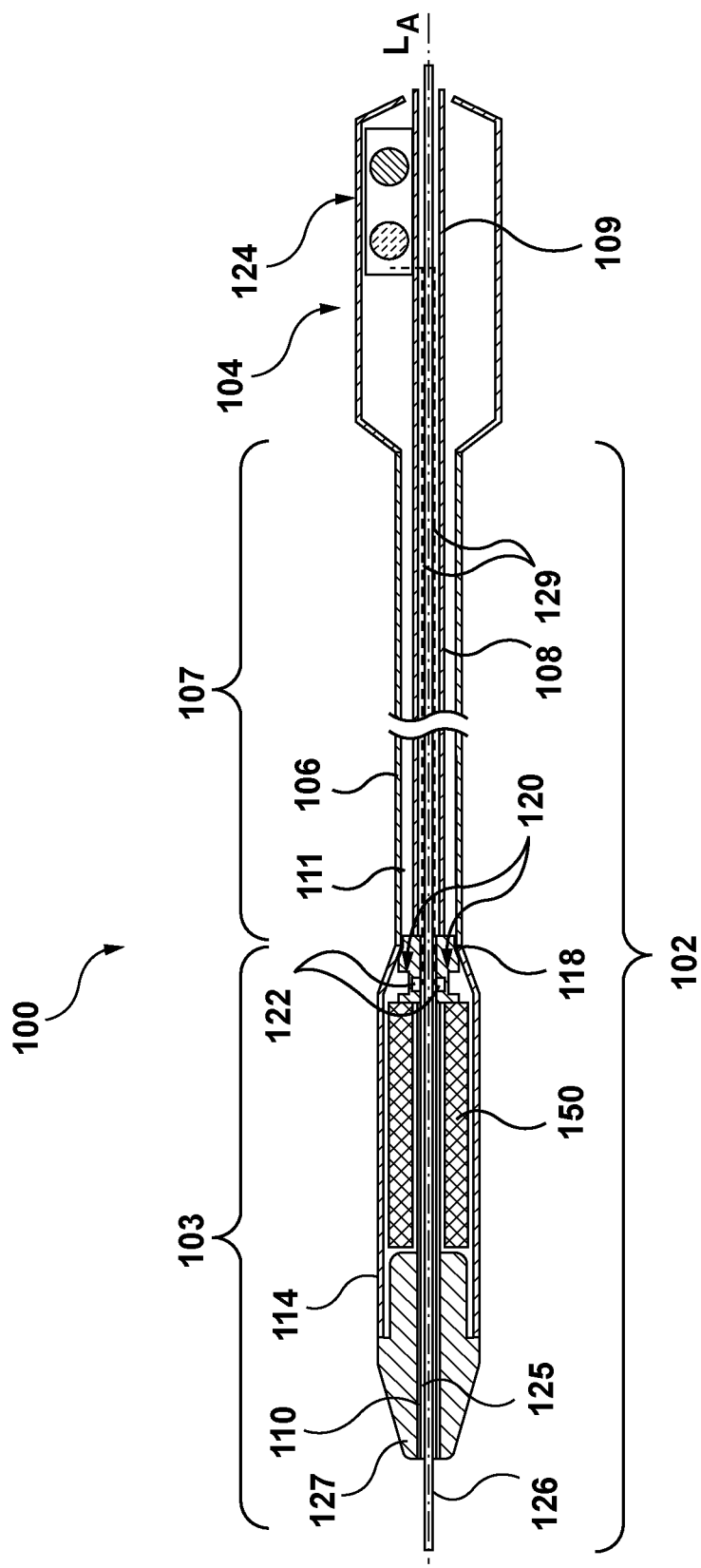
FIGS. 1A-1E depict different views of a prosthesis delivery system, according to an embodiment hereof

Specific embodiments of the present disclosure are now described with reference to the figures, wherein like reference numbers indicate identical or functionally similar elements. The following detailed description describes examples of embodiments and is not intended to limit the present technology or the application and uses of the present technology. Although the description of embodiments hereof is in the context of implantable medical devices, the present technology may also be used in other devices. Furthermore, there is no intention to be bound by any expressed or implied theory presented in the preceding technical field, background, brief summary or the following detailed description.

The terms "distal" and "proximal", when used in the following description to refer to a delivery system or catheter are with respect to a position or direction relative to the treating clinician. Thus, "distal" and "distally" refer to positions distant from, or in a direction away from the treating clinician, and the terms "proximal" and "proximally" refer to positions near, or in a direction toward the clinician. The terms "distal" and "proximal", when used in the following description to refer to a device to be implanted into a vessel, such as a heart valve prosthesis, are used with reference to the direction of blood flow. Thus, "distal" and "distally" refer to positions in a downstream direction with respect to the direction of blood flow, and the terms "proximal" and "proximally" refer to positions in an upstream direction with respect to the direction of blood flow.

Embodiments disclosed herein are directed to a prosthesis delivery system for delivering implantable medical device (e.g., a prosthesis including a stent and replacement heart valve) to an implantation or target site (e.g., native heart valve). To ensure that the implantable medical device is properly loaded on the prosthesis delivery system, a delivery catheter of the prosthesis delivery system includes one or more sensors. The one or more sensors are positioned and configured to assist with the loading of the implantable medical device and provide confirmation that the implantable medical device is properly loaded. For example, the one or more sensors can be positioned and configured to detect and output the positioning, location, and alignment of attachment components (e.g., paddles) of the implantable medical device relative to connection components (e.g., spindle pockets) of the delivery catheter. The one or more sensors provide the positioning, location, and alignment to an indicator that provides visual, audio, or physical feedback indicating proper loading.

FIGS. 1A-1E illustrates several views a prosthesis delivery system 100 in accordance with an embodiment hereof. One skilled in the art will realize that FIGS. 1A-1E illustrate one example of a delivery system and that existing components illustrated in FIGS. 1A-1E may be removed and/or additional components may be added to the prosthesis delivery system 100.

As illustrated in FIG. 1A, which is a cross-section view of the prosthesis delivery system 100, the prosthesis delivery system 100 includes a delivery catheter 102, also referred to herein as a delivery device. The prosthesis delivery system 100 also includes a handle 104 for controlling operations of the delivery catheter 102. An implantable medical device 150 is mounted in a radially compressed configuration at a distal portion 103 of the delivery catheter 102. The prosthesis delivery system 100, by operation of the delivery catheter 102 with the handle 104, is configured to deliver and release or deploy the implantable medical device 150 at a desired treatment location or target site. Accordingly, the prosthesis delivery system 100 is sized and configured to be advanced through a vasculature in a minimally invasive manner.

Figure 1B:
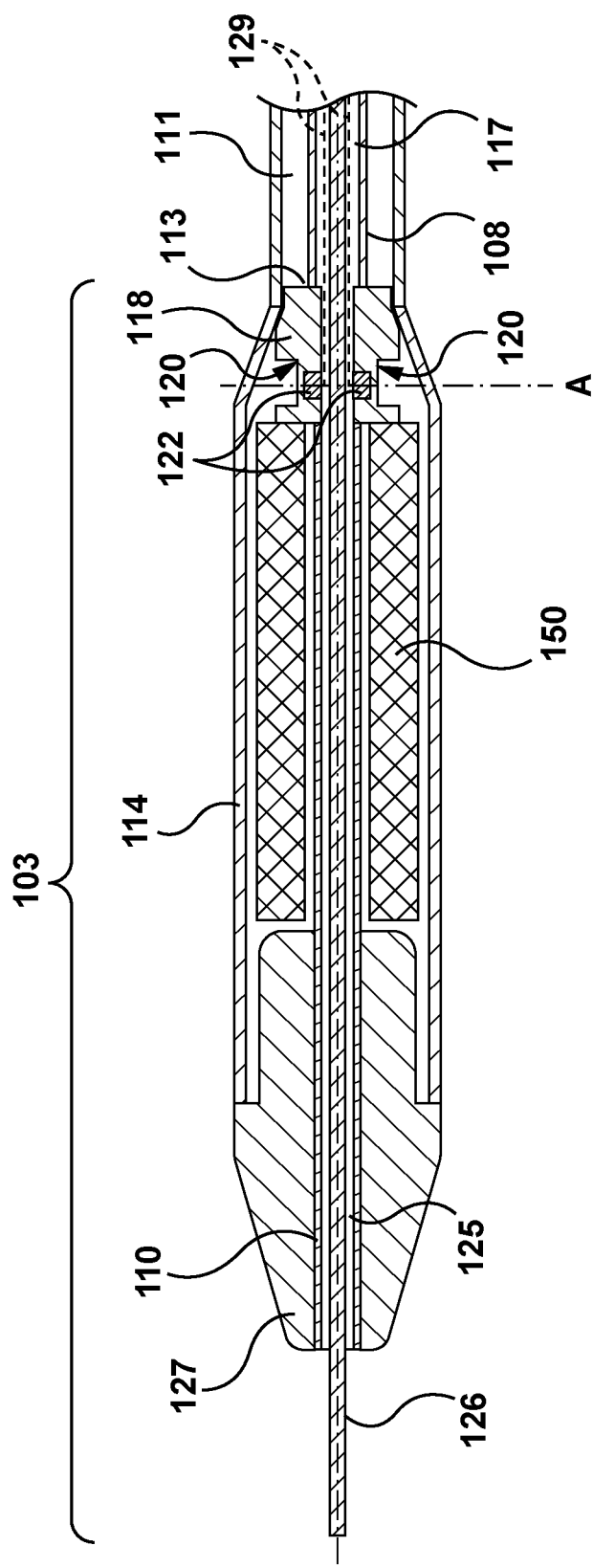

As illustrated in FIG. 1A and further illustrated in FIG. 1B, which is an expanded view of the distal portion 103, the delivery catheter 102 includes an outer sheath 106, a middle shaft 108, and an inner shaft 110. The outer sheath 106 can include a proximal portion 107 that extends from the handle 104 to the distal portion 103. The outer sheath 106 forms a lumen 111 in which the middle shaft 108 extends from the handle 104 to a spindle 118 located in the distal portion 103. The outer sheath 106 can also include a distal portion 114 that extends over the spindle 118 and the implantable medical device 150, when in a compressed configuration. In embodiments, the outer sheath 106 can be formed as a tubular structure having a circular cross-section. In some embodiments, the distal portion 114 of the outer sheath 106 can be formed having a same diameter as the proximal portion 107. In some embodiments, the distal portion 114 of the outer sheath 106 can be formed to a diameter that is larger than a diameter of the proximal portion 107. In embodiments, the distal portion 114 of the outer sheath 106 may be used with the delivery catheter 102 to minimize intravascular trauma during introduction, tracking and delivery of the delivery catheter 102 to the desired treatment location. As described in further detail below, during operations, the distal portion 114 of the outer sheath 106 can be retracted (or advanced) by operation of the handle 104, thereby exposing the implantable medical device 150.

In embodiments, the middle shaft 108 has a proximal end 109 disposed within the handle 104. The middle shaft 108 extends from the handle 104 through the lumen 111 to a distal end 113. The distal end 113 of the middle shaft 108 is disposed inside of the outer sheath 106 when the outer sheath 106 is disposed over the implantable medical device 150. The middle shaft 108 can be coupled to the spindle 118 at the distal end 113. As illustrated in FIG. 1B, the middle shaft 108 forms a lumen 117 in which the inner shaft 110 extends from the handle 104 to a tip 127 located in the distal portion 103. In embodiments, the middle shaft 108 can be formed as a tubular structure having a circular cross-section. The middle shaft 108 can be slidably disposed within the outer sheath 106 and operatively coupled to the handle 104. As used herein, "slidably" denotes back and forth movement in a longitudinal direction along or generally parallel to a central longitudinal axis LA of the prosthesis delivery system 100.

In embodiments, the inner shaft 110 can distally extend from within the handle 104 through the lumen 117 of the middle shaft to the tip 127 located in the distal portion 103. The inner shaft 110 can form a lumen 125 through which a guidewire 126 can pass. In embodiments, the guidewire 126 can operate as a guide for the delivery catheter 102 to a target site, e.g., native heart valve. The guidewire 126 can be loaded into the distal opening of the lumen 125 (e.g., a proximal end of the guidewire 126 is loaded into a distal end of the lumen 125 formed by the inner shaft 110). The delivery catheter 102 can be tracked over the guidewire 126 to the treatment site. While not illustrated, the delivery catheter 102 can include additional shafts or sheaths positioned within the lumen 111 of the outer sheath 106, the lumen 117 formed by the middle shaft 108, and/or the lumen 125 formed by the inner shaft 110.

Figure 1C:
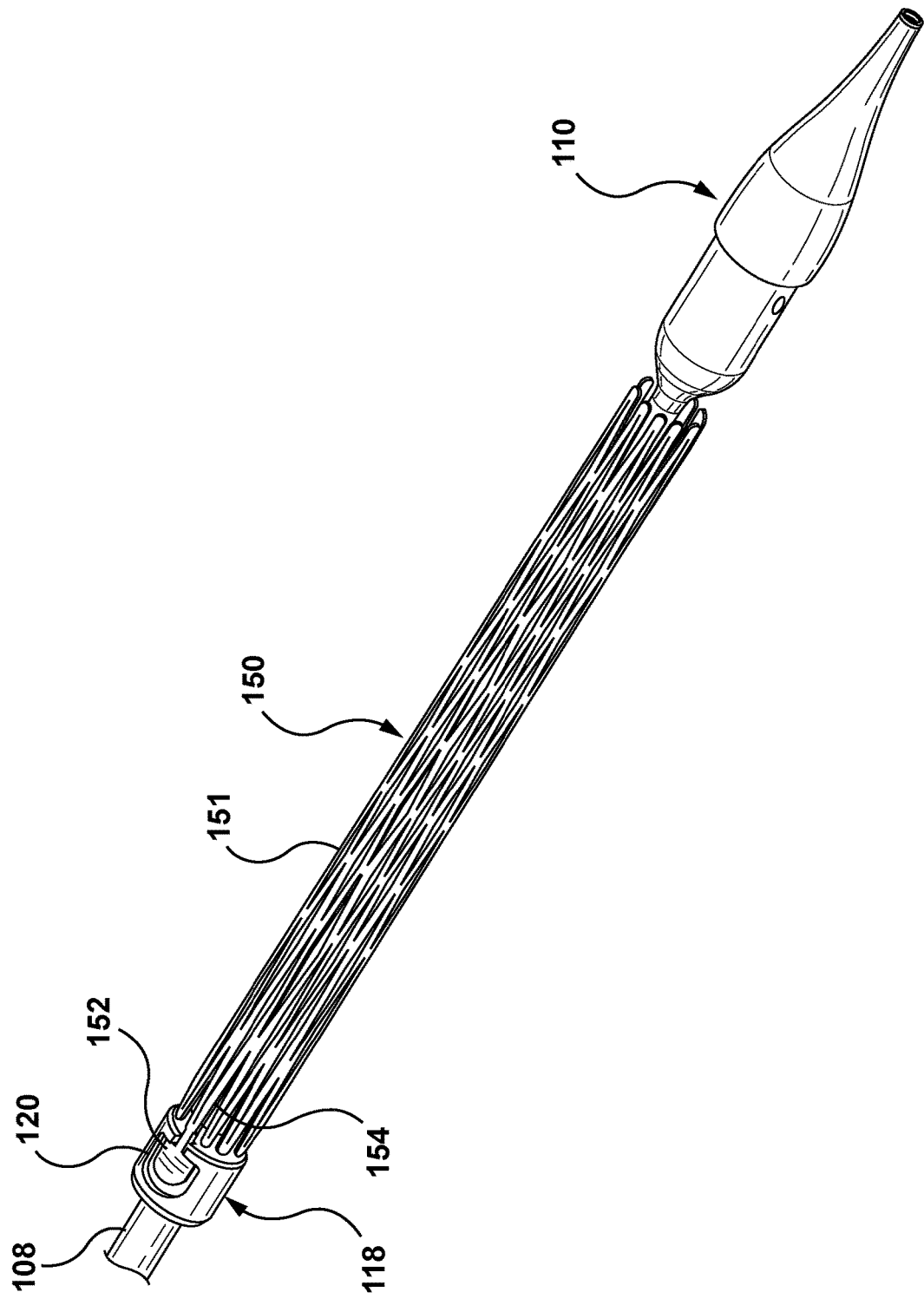

As illustrated in FIG. 1B and FIG. 1C, which is a perspective view of the distal portion 103, having the outer sheath 106 removed for illustrative purposes only, the distal end 113 of the middle shaft 108 is coupled to the spindle 118. In embodiments, the implantable medical device 150 can be releasably coupled to the spindle 118. As illustrated in FIG. 1C, the implantable medical device 150 can include a frame or stent 151 that is configured to support a medical device (e.g., replacement heart valve) to be implanted. The stent 151 can include one or more paddles 152 (one paddle 152 illustrated in FIG. 1C) that extend from a first end of the stent 151 in the situated in the delivery system 100 in the proximal direction. For example, as illustrated, the paddles 152 can extend from one or more structural supports or struts 154 of the stent 151.

The spindle 118 can be a tubular component having at least one pocket 120 formed on an outer surface thereof In some embodiments, the spindle 118 can be formed in cylindrical shape. The pocket 120 is configured to receive the paddle 152 extending from the implantable medical device 150. The paddle 152 fits within or mates with the pocket 120 of the spindle 118 such that the implantable medical device 150 is releasably coupled to the spindle 118 and thereby the middle shaft 108. When the paddle 152 is properly mated with the pocket 120, the paddle 152 can be contained within the pocket 120 such that the paddle 152 does not extend beyond the circumference of the spindle 118 thereby allowing the distal portion 114 of the outer sheath 106 to cover the spindle 118 without forming a forming a "bulge" or incongruity in the surface of the outer sheath 106. Although only one pocket 120 is visible on FIG. 1B, it will be understood by one of ordinary skill in the art that the spindle 118 may include two or more pockets 120 for receiving a corresponding mating paddle of the implantable medical device 150. For example, in an embodiment, as illustrated in FIGS. 1A and 1C, the spindle 118 can include two pockets 120 that are formed at opposing circumferential locations on the spindle 118.

Figure 1D:
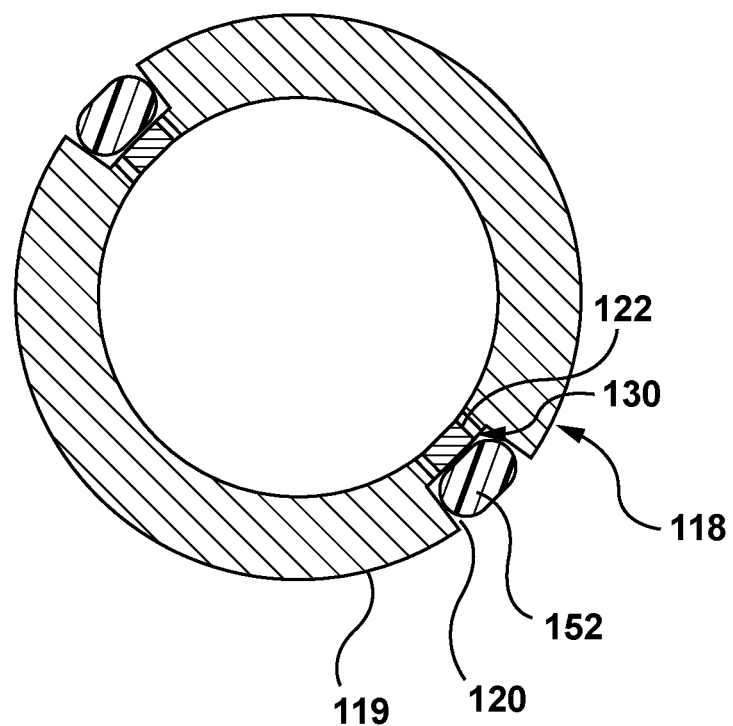

In embodiments, the pockets 120 can be formed to a dimension and shape that matches or mates with the paddles 152. For example, as illustrated in FIG. 1B, the pocket 120 can be formed as a recess within the spindle 118 that has a semi-hemispherical or "bell" shape. The shape of the pocket 120 can mirror the shape of the paddle 152 such that the paddle 152 fits within the pocket 120. As illustrated in FIG. 1D, which is a radial cross-section view of the taken along line A (FIG. 1C), the pockets 152 can be formed to a depth such that the paddle 152 fits within the pocket 120 without extended beyond an outer, circumferential surface 119 of the spindle 118. While FIGS. 1A-1E illustrate one configuration of the pockets 120 and the paddles 152, one skilled in the art will realize that the pockets 120 and the paddles 152 can be formed in any complementary design, shape, and/or size. In some embodiments, the pockets 120 and paddles 152 can be configured to interlock.

Figure 2A:
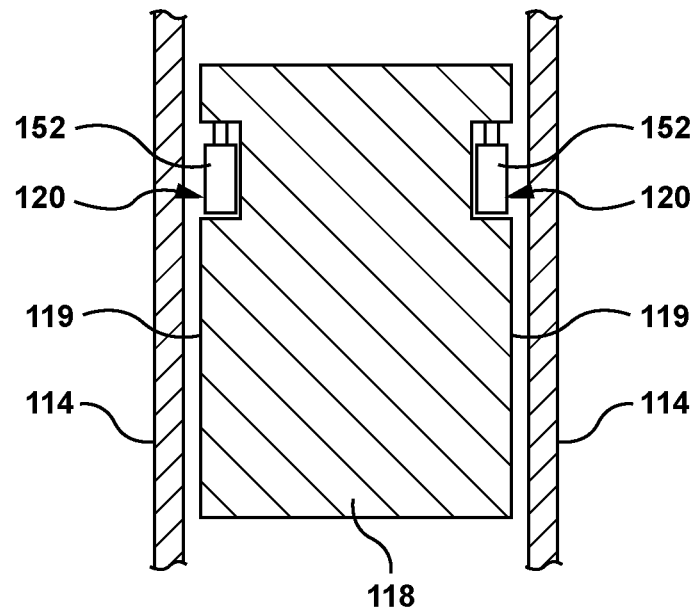
FIGS. 2A-2D depict different views of alignments of paddles of a stent in the prosthesis delivery system of FIGS. 1A-1E, according to an embodiment hereof
Figure 2B:
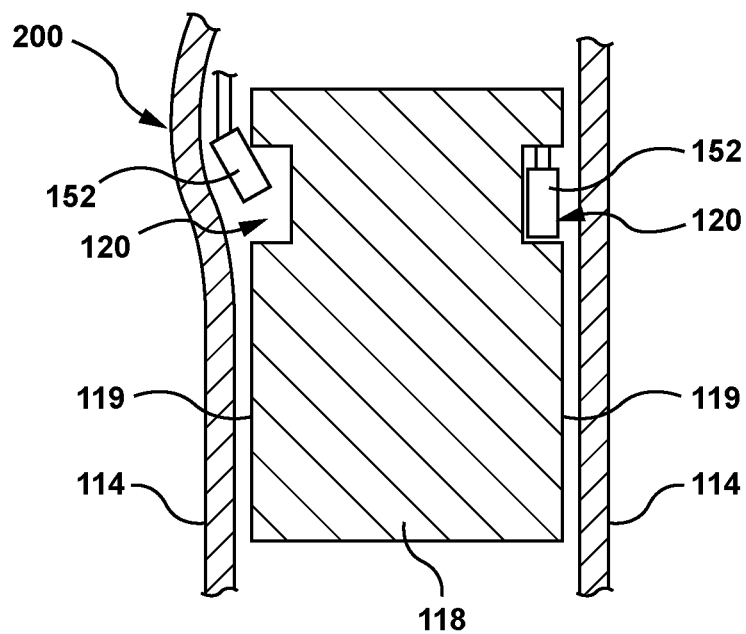

During delivery to a target site (e.g., native heart valve location), the outer sheath 106 can cover the implantable medical device 150 and retain the paddles 152 within the pockets 120, as illustrated in FIGS. 2A and 2B, which are axial cross-sectional views of the spindle 118. As illustrated in FIG. 2A, when the implantable medical device 150 is properly loaded (e.g., the paddles 152 are contained within the pockets 120), the distal portion 114 of the outer sheath 106 contacts the outer surface 119 of the spindle 118 thereby forming a continuous surface. To release the implantable medical device 150, the distal portion 114 of the outer sheath 106 can be retracted (or advanced) by operation of the handle 104, thereby exposing the implantable medical device 150 and at least a portion of the spindle 118. The implantable medical device 150 can then be deployed by expanding the stent 151 to a partially uncompressed or fully uncompressed state.

Figure 2C:
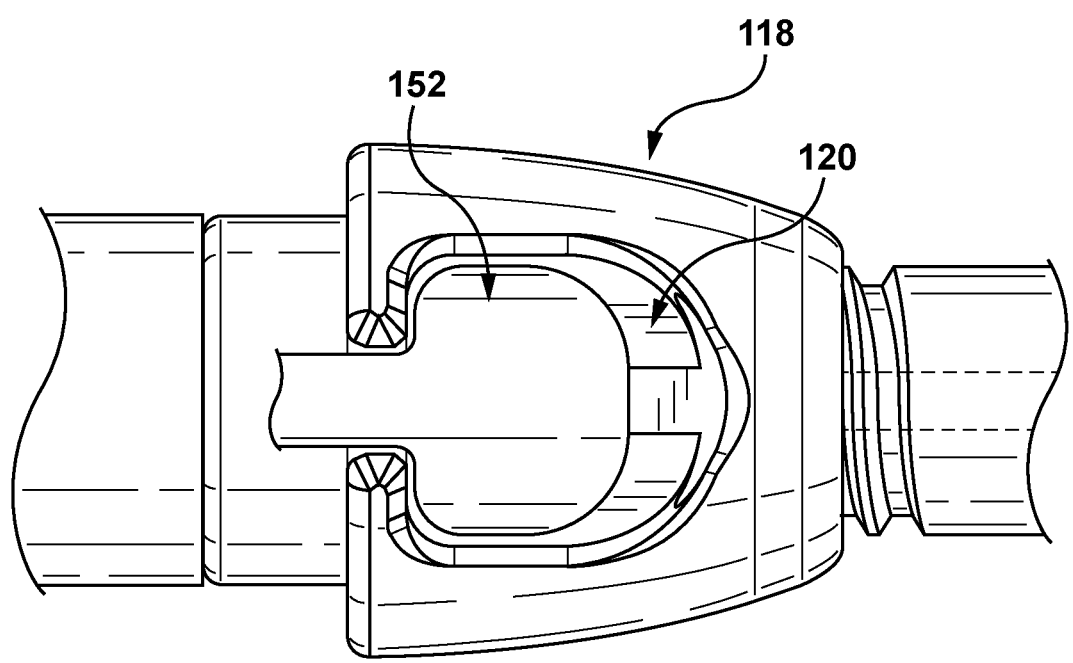

During loading of the implantable medical device 152 onto the delivery catheter 102, it is important that the paddles 152 properly mate with the pockets 120. As illustrated in FIG. 2A and FIG. 2C, which is a perspective view of the spindle 118 with the distal portion 114 of the outer sheath 106 removed, if the implantable medical device 150 is properly loaded, the paddles 152 can be seated within the pockets 120, e.g., completely contained within the recess formed by the pockets 120. That is, the paddles 152 rest within the pockets 120 such that the paddles 152 do not extend beyond the outer surface 119 of the spindle 118. This allows the distal portion 114 of the outer sheath 106 to cover the implantable medical device 150 and retain the paddles 152 within the pockets 120 without interfering with the implantable medical device 150.

Figure 2D:
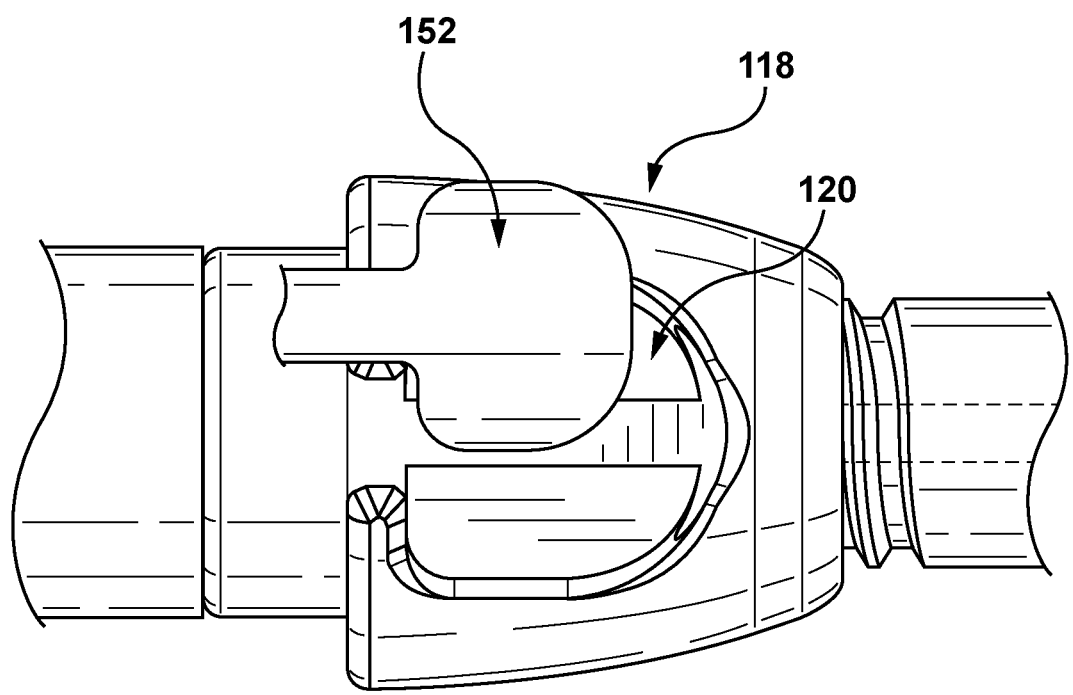
Figure 3:
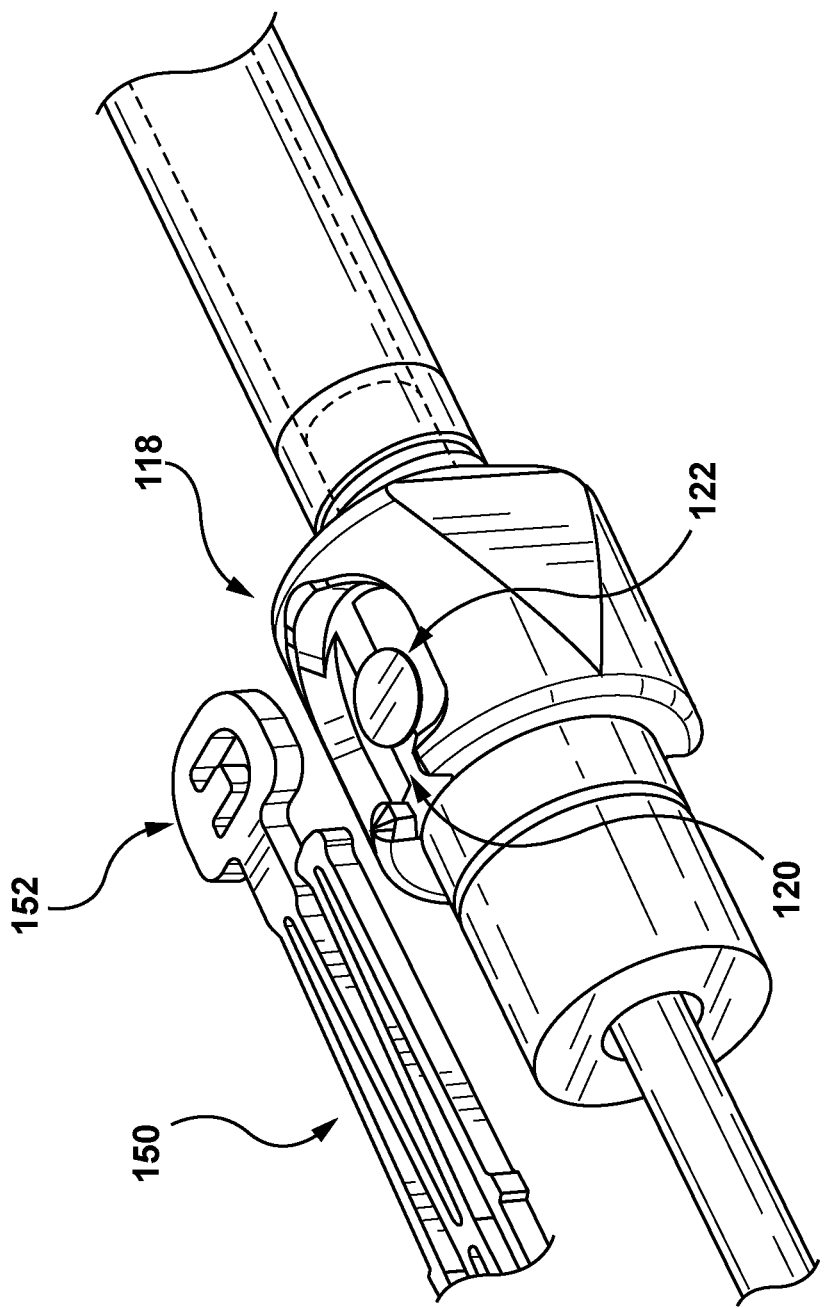
FIG. 3 depicts one example of positioning of sensors in the prosthesis delivery system of FIGS. 1A-1E, according to an embodiment hereof

If the implantable medical device 150 is not properly loaded, one or more of the paddles 152 may not completely seat within the pockets 120, as illustrated in FIG. 2B and FIG. 2D, which is a perspective view of the spindle 118 with the distal portion 114 of the outer sheath 106 removed. If one of the paddles 152 is not properly seated within one of the pockets 120, the outer sheath 106 can interfere and bind the paddle 152. For example, when not seated within the pocket 120, the distal portion 114 of the outer sheath 106 can compress a portion of the paddle 152 against the outer surface 119 of the spindle 118 thereby potentially bending or warping the paddle 152 or the stent 151. This improper loading may cause damage to the implantable medical device 150. Additionally, because the paddle 152 is not completely contained within the pocket 120, the paddle 152 can create a "bulge" 200 in the outer sheath 106, which may affect the delivery of the implantable medical device 150 to a target site.

Typically, to ensure that the implantable medical device 150 is properly loaded onto the delivery catheter 102, a user of the prosthesis delivery system 100 uses an imaging device (e.g., fluoroscope) to view the delivery catheter 102 and the implantable medical device 150, after the implantable medical device 150 is loaded. This process, however, can be difficult and can expose a technician to radiation. Also, because the check is performed after the implantable medical device 150 is loaded, the implantable medical device may be unnecessarily damaged. Moreover, if the implantable medical device 150 was previously loaded, this process may need to be repeated at the time of implantation by a doctor or other technician, who may not have proper training to identify a mis-load.

In embodiments, to ensure proper loading of the implantable medical device 150, the delivery catheter 102 can include one or more sensors 122 that are configured to provide an indication of proper loading of the implantable medical device 150. As shown in FIGS. 1A and 1B, the spindle 118 includes one or more sensors 122 for detecting the positioning, location, and alignment of the paddles 152 relative to the pockets 120. The sensors 122 are configured to detect the presence, position, and alignment of the paddles 152 relative to the pockets 120. The sensors 122 are coupled to an indicator 124 that may be positioned on the handle 104. The indicator 124 can be configured to output data collected by the sensors 122, e.g., data representing the positioning, location, and alignment of the paddles 152 relative to the pockets 120. In embodiments, the indicator 124 can be configured to output feedback to a user of the prosthesis delivery system 100 that includes the positioning, location, and alignment of the paddles 152 relative to the pockets 120. The indicator 124 can output feedback, based on the data collected by the sensors 122, in any type of format that can be perceived by a user of the prosthesis delivery system 100, e.g., visual, audio, haptic, etc.

The sensors 122 can be coupled to the indicator 124 by one or more wires 129, as illustrated in FIGS. 1A and 1B.

The wires 129 can be configured to transmit the data collected by the sensors to the indicator 124. Likewise, the wires 129 can be configured to supply power to the sensors 122 from a power supply (not shown). In embodiments, the wires 129 can be positioned within the lumen 117 defined by the middle shaft 108. In some embodiments, the power supply can be located in the handle 104. The power supply can be any type of device that supplies power to the sensors 122, the indicator 124, and/or any other component of the prosthesis delivery system 100. While the sensors 122 are described as being connected to the indicator 124 by one or more wires 129, one skilled in the art will realize that data can be communicated between the sensors 122 and the indicator 124 by any type of data communication device or process, for example, wireless communications. Likewise, while the sensors are described as being connected to the power supply by one or more wires 129, one skilled in the art will realize that the sensors 122 can receive power from other sources such as an internal power source within the sensors 122 (e.g., batteries), wireless power transfer, etc. Further, while the 124 is shown as disposed on the handle 104, the indicator 124 may be separate from the handle 104, particularly in the case of wireless communication, such as on a mobile device, medical monitor, etc.

The handle 104 can also one or more activation devices to activate the sensors 122 and the indicator 124. The activation devices can be any type of mechanical, electrical, and/or electro-mechanical device that activates the sensors 122 and/or the indicator 124. For example, the activation devices can include buttons, switches, knobs, etc.

In embodiments, the sensors 122 can be positioned on and/or positioned within the spindle 118 at location that can detect whether the paddles 152 are properly mated with the pockets 120. In an embodiment, as illustrated in FIGS. 1A, 1C, and 1D, each of the pockets 120 can include a single sensor 122. For each pocket 120, the sensor 122 can be formed within a bottom surface 130 of the pocket 120, as illustrated in FIG. 1D. The sensor 122 can be configured to detect the presence of the paddles 152 in the pockets 120 and relay a signal back to the indicator 124.

For example, as illustrated in FIG. 1A, the indicator 124 can be a visual indicator that includes a red light and a green light. When the sensors 122 and the indicator 124 are activated, the indicator 124 can display either a red light that indicates improper alignment or a green light that indicates proper alignment, e.g., the paddles 152 being within the pockets 120. In operation, as further described below, the sensors 122 can be configured to detect the presence of the paddles 152. When one or both of the paddles 152 is not within the corresponding pocket 120, the corresponding sensor 122 provides a signal to the indicator 124 representing the absence of the paddle 152, and, in response, the indicator 124 displays a red light. If both of the paddles 152 are within the pockets 120, the sensors 122 provide a signal to the indicator 124 representing the presence of the paddles, and, in response, the indicator 124 displays a green light. While the indicator 124 is described as providing a red or green light indicating proper alignment, one skilled in the art will realize that the indicator 124 can output any type of feedback that is perceivable by a user. For example, the indicator 124 can comprise a display that displays text such as "not aligned" and "aligned." Likewise, for example, the indicator 124 can output auditory feedback indicating alignment, such as a beep, speech such as "aligned," etc. The indicator 124 may instead, or additionally, provide haptic feedback, such as a vibration, indicating proper or improper alignment.

Figure 4A:
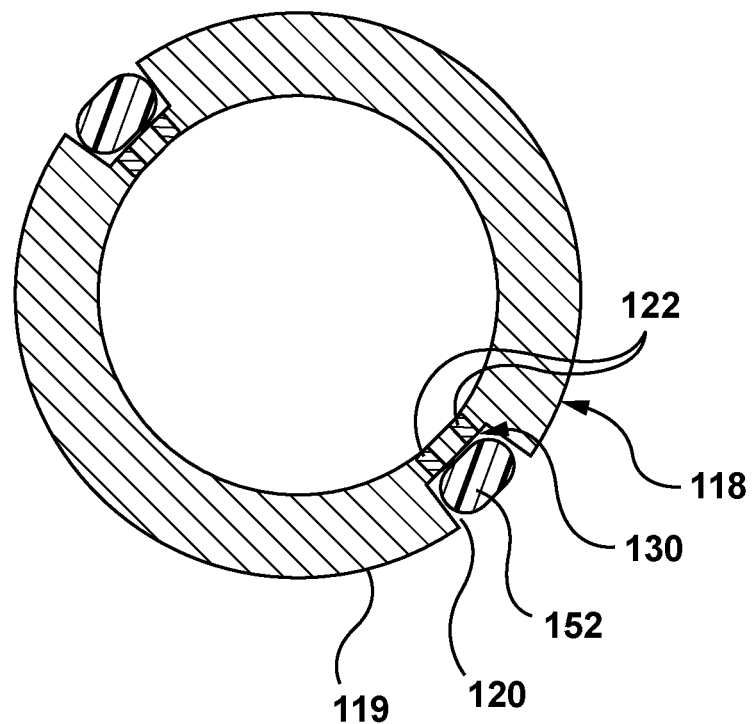
FIGS. 4A and 4B depict another example of positioning of sensors in the prosthesis delivery system of FIGS. 1A-1E, according to an embodiment hereof
Figure 4B:
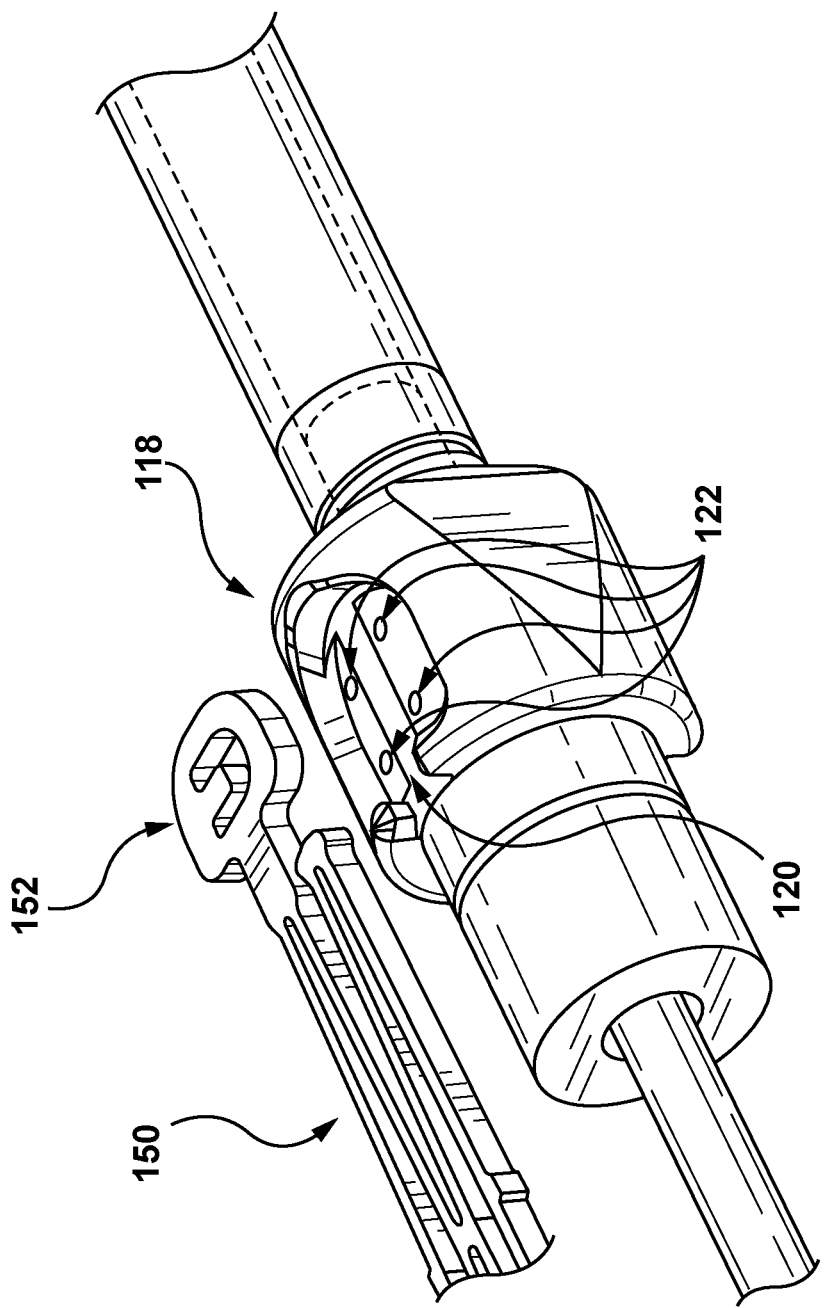

In another embodiment, as illustrated in FIGS. 4A and 4B, which is a radial cross-section view of the taken along line A of FIG. 1C and an enlarged perspective of the spindle 118 respectively, each of the pockets 120 can include multiple sensors 122. For each pocket 120, the sensor 122 can be formed within the bottom surface 130 of the pocket 120 in a pattern around the bottom surface 130 of the pocket 120, as illustrated in FIG. 4B. For example, as illustrated, each pocket 120 can include four sensors arranged in a square pattern around the bottom surface 130 of each pocket 120. The multiple sensors 122 in each of the pockets 120 can be configured to operate together to detect the presence of the paddles 152 in the pockets 120 as relay a signal back to the indicator 124. While FIGS. 4A and 4B illustrate four sensors 122 formed in a square pattern in each pocket 120, one skilled in the art will realize that this is one example and each pocket 120 can include any number of multiple sensors 122, formed in any pattern in each pocket 120.

During operation of the embodiment illustrated in FIGS. 4A and 4B, the indicator 124 can be a visual indicator that includes a red light and a green light. When the sensors 122 and the indicator 124 are activated, the indicator 124 can display either a red light that indicates improper alignment or a green light that indicates proper alignment, e.g., the paddles 152 being within the pockets 120. In operation, as further described below, the sensors 122 can be configured to detect the presence of the paddles 152. In this embodiment, the multiple sensors 122 can operate together to detect the presence 152. For example, the indicator 124 may only display a green light when a threshold number of the multiple sensors 122 indicate the presence of the paddles 152.

That is, when the paddles 152 are not within the pockets 120, all of the multiple sensors 122 provide a signal to the indicator 124 representing the absence of the paddles 152, and, in response, the indicator 124 displays a red light. If one of the paddles 152 is partially within one of the pockets 120, a portion of the multiple sensors 122 (e.g., three of the sensors 122) provide a signal to the indicator 124 representing the absence of the paddles 152, and a portion of the multiple sensors 122 (e.g., one of the sensors 122) provide a signal to the indicator 124 representing the presence of the paddles 152. If the number of sensors 122 detecting the presence of the paddles 152 is above a threshold, the indicator 124 displays a green light. In some embodiments, the threshold number of the multiple sensors 122 may be all the sensors 122. In other embodiments, the threshold number of the multiple sensors 122 may be less than all the sensors 122, for example, three of the four sensors 122. While the indicator 124 is described as providing a red or green light indicating proper alignment, one skilled in the art will realize that the indicator 124 can output any type of feedback that is perceivable by a user. For example, the indicator 124 can comprise a display that displays text such as "not aligned" and "aligned." Likewise, for example, the indicator 124 can output auditory feedback indicating alignment, such as a beep, speech such as "aligned", etc. The indicator 124 may instead, or additionally, provide haptic feedback, such as a vibration, indicating proper or improper alignment.

Figure 5A:
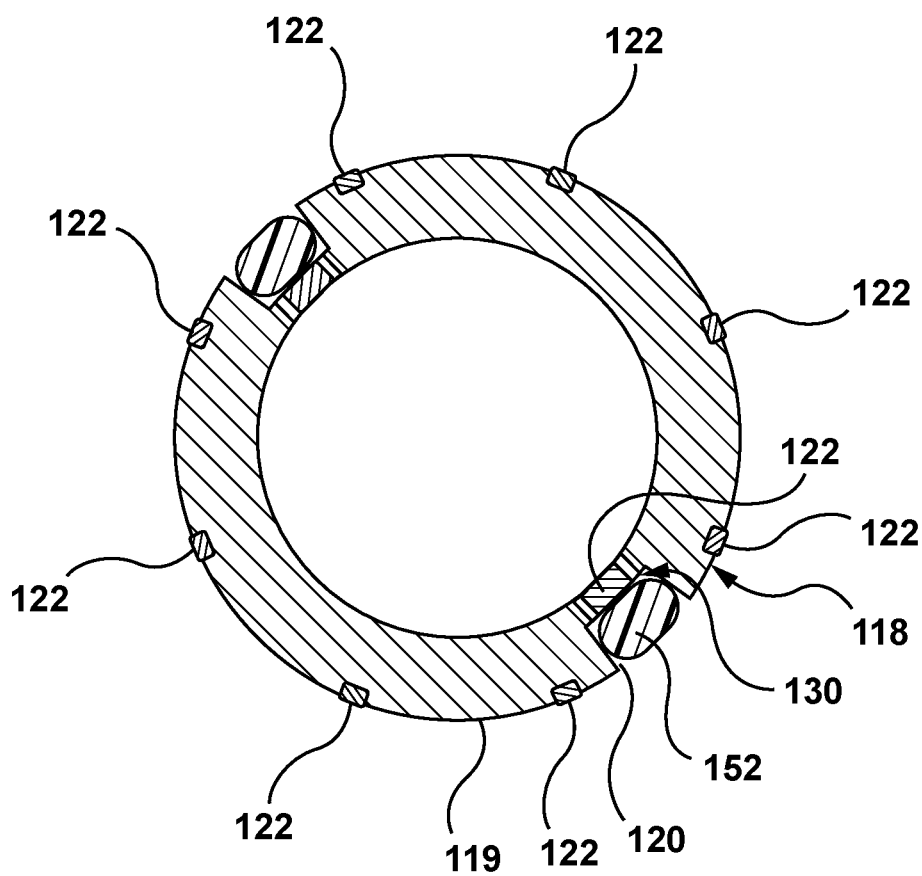
FIGS. 5A and 5B depict another example of positioning of sensors in the prosthesis delivery system of FIGS. 1A-1E, according to an embodiment hereof
Figure 5B:
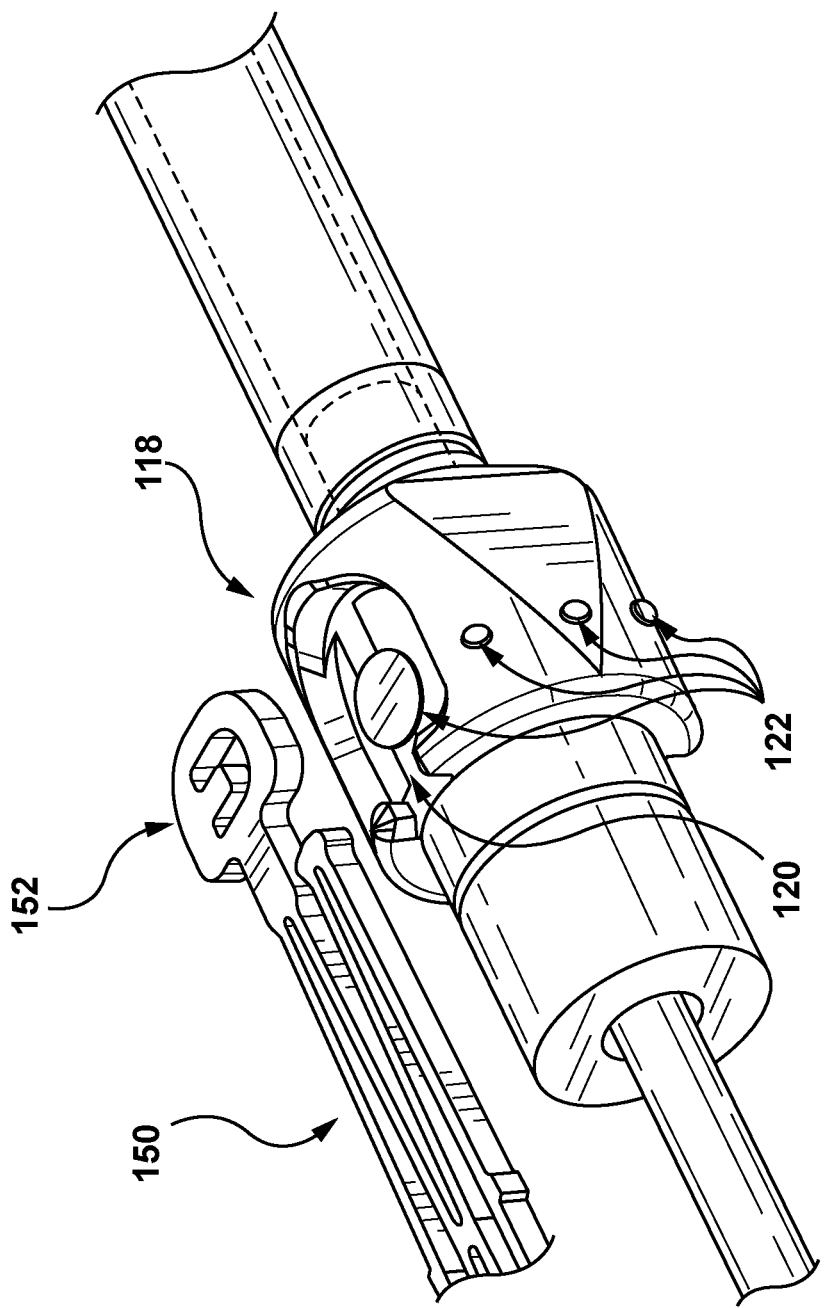

In another embodiment, as illustrated in FIGS. 5A, which is a radial cross-section view of the taken along line A of FIG. 1C and an enlarged perspective of the spindle 118 respectively, in addition to the pockets 120 including sensors 122 as described above, one or more of the sensors 122 can be positioned around the outer surface 119 of the spindle 118. For example, the sensors 122 can be formed within the outer surface 119 at equal spaced distances around the spindle 118, as illustrated in FIG. 5A. As illustrated, the spindle 118 can include eight sensors 122 spaced around the circumference of the spindle 118. The sensors 122 in each of the pockets 120 and the sensors 122 around the outer surface 119 of the spindle 118 can be configured to operate together to detect the presence of the paddles 152 in the pockets 120 and relay a signal back to the indicator 124. While FIGS. 5A and 5B illustrate eight sensors 122 formed in around the circumference of the spindle 118, one skilled in the art will realize that this in one example and the spindle 118 can include any number of sensors 122, formed in any pattern in on the outer surface 119 of the spindle 118. For example, the spindle 118 can include one or more of the sensors 122 formed within the outer surface 119 around the pockets 120.

During operation of the embodiment illustrated in FIGS. 5A and 5B, the indicator 124 can be a visual indicator that includes a red light and a green light. When the sensors 122 and the indicator 124 are activated, the indicator 124 can display either a red light that indicates improper alignment or a green light that indicates proper alignment, e.g., the paddles 152 being within the pockets 120. In operation, as further described below, the sensors 122 can be configured to detect the presence of the paddles 152 and relay a signal to the indicator 124. In this embodiment, the sensors 122 in each of the pockets 120 and the sensors 122 around the outer surface 119 of the spindle 118 can operate together to detect the presence of the paddles 152. For example, the indicator 124 may only display a green light when the sensors 122 located within the outer surface 119 of the spindle 118 indicate the absence of the paddles 152, the sensor 122 within the pockets 152 indicate the presence of the paddles 152 within the pockets 120, or combinations thereof.

That is, when the paddles 152 are not within the pockets 120 or only partially within the pockets 120, one or more sensors 122 located within the outer surface 119 can detect the paddles 152 and provide a signal to the indicator 124 representing the presence of the paddles 152 on the outer surface 119. In response, the indicator 124 displays a red light. If none of the sensors 122 located within the outer surface 119 detects the paddles 152 (and the sensors 122 within the pocket 120 detect the paddles), the indicator 124 displays a green light. While the indicator 124 is described as providing a red or green light indicating proper alignment, one skilled in the art will realize that the indicator 124 can output any type of feedback that is perceivable by a user. For example, the indicator 124 can comprise a display that displays text such as "not aligned" and "aligned." Likewise, for example, the indicator 124 can output auditory feedback indicating alignment, such as a beep, speech such as "aligned", etc. The indicator 124 may instead, or additionally, provide haptic feedback, such as a vibration, indicating proper or improper alignment.

In the above description, the spindle 118 is described as including the sensors 122 within the pocket 120 and within the outer surface 119. One skilled in the art will realize that the spindle 118 can include any number of the sensors 122 in any configuration described above. For example, the sensors 122 may only be included in the pockets 120. Likewise, for example, the sensors 122 may only be included within the surface 119 of the spindle 118. Likewise, for example, the sensors 122 may be included in both the pockets 120 and the outer surface 119. One skilled in the art also will realize that the sensors 122 can be positioned relative to the spindle 118 in any manner. For example, as discussed above, the sensors 122 can be located within the outer surface 119 and positioned at any depth from the outer surface 119. Likewise, for example, the sensors 122 can be positioned on the outer surface 119.

In any of the embodiments described above, the sensors 122 can be any type of sensing device that detects the presence of the paddles 152. In an embodiment, the sensors 122 can be capacitive sensors. As disclosed herein, a capacitive sensor can be configured to detect and measure anything that is conductive or has a dielectric different from air or surrounding materials. For example, the capacitive sensor can operate utilizing mutual capacitance where the paddles 152 alter the mutual coupling between row and column electrodes formed in the sensors 122, which are scanned sequentially. The sensor 122 can output a signal that represents self or absolute capacitance where the paddles 152 loads the sensor 122 or increases the parasitic capacitance to ground. In both cases, the difference of a preceding absolute position from the present absolute position yields the relative motion of the paddle 152 during that time. Capacitive sensors can be constructed for materials such as copper, indium tin oxide (ITO), printed conductive inks, and the like.

When the sensors 122 include capacitive sensors, the indicator 124 can be configured to read signals provided by the sensors 122 to determine the capacitance. The indicator 124 can be configured to compare the capacitance of the sensors 122 to a capacitance threshold. If the capacitance read from the sensors 122 exceeds the capacitance threshold, the indicator 124 can determine that the sensors 122 have detected the presence of the paddles 152 and output the appropriate feedback. In embodiments, for example, the indicator 124 can be configured to read (or receive) voltage values from the sensors 122 that represents the capacitance of the sensors 122. The indicator 124 can be configured to include circuitry or logic that determines the capacitance from the voltage values of the sensors and compares the capacitance to a capacitance threshold to determine whether the paddles 152 are present within the pockets 120.

In another embodiment, the sensors 122 can include mechanical, electrical, and/or electronic mechanical devices that cause activation of an electrical circuit. In this embodiment, the sensors 122 can be part of an electrical circuit formed by the sensors 122, the indicator 124, and the wires 129. When the paddles 152 contact the sensors 122, the electrical circuit is completed, and a signal indicating the presence of the paddles 152 is transmitted to the indicator 124. In some embodiments, the sensors 122 can include a mechanical, electrical, and/or electronic mechanical switch that is activated by the presence of the paddles 152. In some embodiments, the sensors 122 can include corresponding contacts that complete the electrical circuit when a conductive material of the paddles 152 contact the sensors 122.

In another embodiment, the sensors 122 can include a force sensor. The force sensor can be configured to detect a force applied by the paddles 152 on the sensors 122. The indicator 124 can be configured to include circuitry or logic that determines the force from the signals from the sensors and compares the force to a force threshold to determine whether the paddles 152 are present within the pockets 120. When the sensors 122 include force sensors, the indicator 124 can be configured to read signals provided by the sensors 122 to determine the force measured by the sensors 122. The indicator 124 can be configured to compare the force detected by the sensors 122 to a force threshold. If the force read from the sensors 122 exceeds the force threshold, the indicator 124 can determine that the sensors 122 have detected the presence of the paddles 152 and output the appropriate feedback.

In another embodiment, the sensors 122 can include a pressure sensor. The pressure sensor can be configured to detect a pressure applied by the paddles 152 on the sensors 122. The indicator 124 can be configured to include circuitry or logic that determines the pressure from the signal received from the sensors 122 and compares the pressure to a pressure threshold to determine whether the paddles 152 are present within the pockets 120. When the sensors 122 include pressure sensors, the indicator 124 can be configured to read signals provided by the sensors 122 to determine the pressure measured by the sensors 122. The indicator 124 can be configured to compare the pressure detected by the sensors 122 to a pressure threshold. If the pressure read from the sensors 122 exceeds the pressure threshold, the indicator 124 can determine that the sensors 122 have detected the presence of the paddles 152 and output the appropriate feedback.

Returning to FIG. 1A, the handle 104 can include a housing and one or more actuating mechanisms. The handle 104 can be configured with the one or more actuating mechanisms each extending through the housing of the prosthesis delivery system 100 for interfacing by a user. The one or more actuating mechanisms can be configured to retract/pull or push/advance the outer sheath 106 proximally with respect to the middle shaft 108. The handle 104 provides a surface for convenient handling and grasping by a user, and can have a variety of shapes, including, but not limited to a cylindrical shape. In embodiments, the handle 104 can include other various actuating mechanisms such as, but not limited to axially-slidable levers, rotary rack and pinion gears, or other applicable actuating mechanisms. For example, the actuating mechanisms may assume any construction that is capable of providing the desired sheath actuation functionality, such as those described in U.S. Pat. No. 8,579,963 to Tabor, which is herein incorporated by reference in its entirety.

In embodiments, the outer sheath 106, the middle shaft 108, and/or the inner shaft 110 can be constructed of materials such as, but not limited to polyurethane, polyether block amide (PEBA), polyamide polyether block copolymer, polyethylene, or other materials suitable for the purposes of the present disclosure. The outer sheath 106 can be coupled to the actuating mechanism of the handle 104 by adhesives, welding, clamping, and other coupling devices as appropriate. The distal end 111 of the middle shaft 108 can be removably coupled to the spindle 118 by a threaded connection or permanently coupled to the spindle 118 by adhesives, welding, clamping, and other coupling devices as appropriate.

In embodiments, the implantable medical device 150 includes the stent 151 that supports a prosthetic valve component within the interior of the stent 151. In some embodiments, the stent 151 can be self-expanding to return to a radially expanded configuration from a radially compressed or constricted delivery configuration. In some embodiments, the stent 151 can be expanded by a balloon or other inflation device. In any embodiment, portions of the stent 151 can be designed with a number of different configurations and sizes to meet the different requirements of the location in which it may be implanted. For example, the implantable medical device 150 can be configured as a replacement for a aortic valve. Likewise, for example, the implantable medical device 150 can be configured as a replacement for a mitral valve, as disclosed in U.S. Patent Application Publication Nos. 2012/0101572 to Kovalsky et al. and 2012/0035722 to Tuval, each of which are herein incorporated by reference in their entirety. In any embodiment, each portion of the stent 151 can have the same or different cross-section which may be for example circular, ellipsoidal, rectangular, hexagonal, rectangular, square, or other polygonal shape, although at present it is believed that circular or ellipsoidal may be preferable when the valve prosthesis is being provided for replacement of the aortic or mitral valve. In any embodiment, the stent 151 can have a symmetric hourglass configuration, a generally tubular configuration, or other stent configuration or shape known in the art for valve replacement.

Figure 1E:
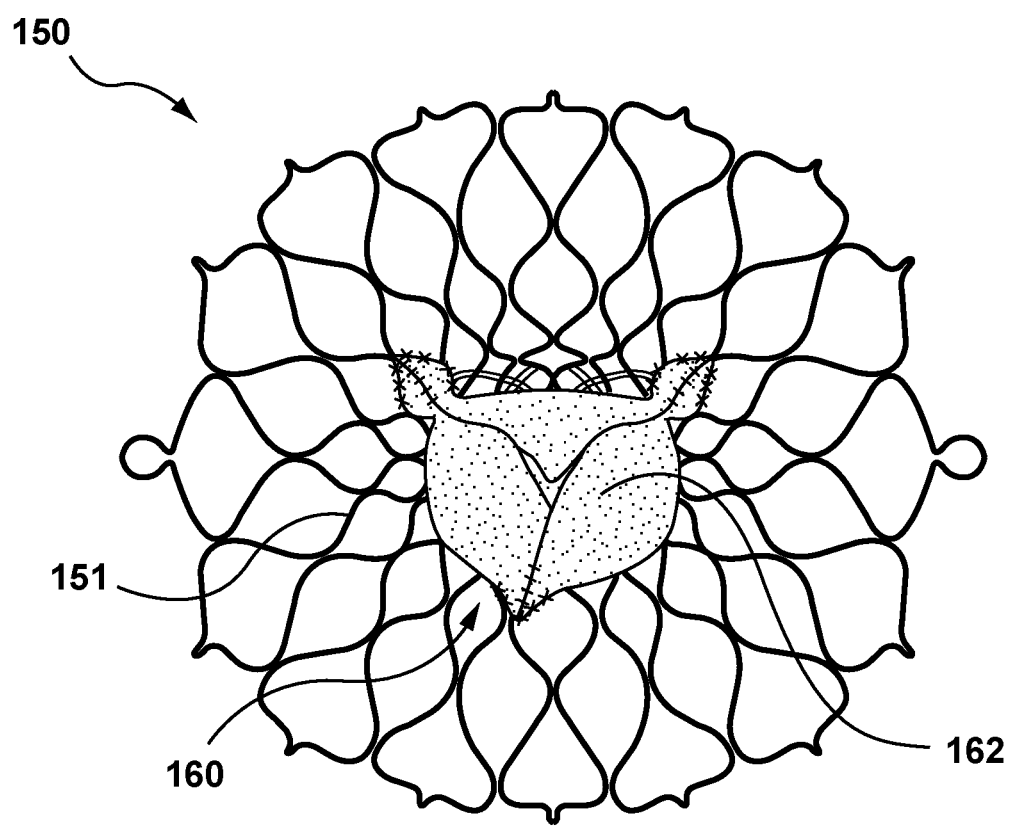

In any embodiment, the prosthetic valve component of the implantable medical device 150 can be capable of blocking flow in one direction to regulate flow there through via valve leaflets that may form a bicuspid or tricuspid replacement valve. FIG. 1E illustrates one example of the implantable medical device 150 including a prosthetic valve component 160. As illustrated in FIG. 1E, the prosthetic valve component 160 can include a tricuspid valve having three leaflets 162, although a bicuspid leaflet configuration may alternatively be used in embodiments hereof. Valve leaflets 162 are sutured or otherwise securely and sealingly attached to the interior surface of the stent 151 as would be known to one of ordinary skill in the art of prosthetic tissue valve construction. The leaflets 162 may be made of pericardial material; however, the leaflets may instead be made of another material. Natural tissue for replacement valve leaflets may be obtained from, for example, heart valves, aortic roots, aortic walls, aortic leaflets, pericardial tissue, such as pericardial patches, bypass grafts, blood vessels, intestinal submucosal tissue, umbilical tissue and the like from humans or animals. Synthetic materials suitable for use as the leaflets 162 include DACRON® polyester commercially available from Invista North America S.A.R.L. of Wilmington, Del., other cloth materials, nylon blends, polymeric materials, and vacuum deposition nitinol fabricated materials. One polymeric material from which the leaflets 162 can be made is an ultra-high molecular weight polyethylene material commercially available under the trade designation DYNEEMA from Royal DSM of the Netherlands. With certain leaflet materials, it may be desirable to coat one or both sides of a leaflet 162 with a material that will prevent or minimize overgrowth. It is further desirable that the leaflet material is durable and not subject to stretching, deforming, or fatigue.

The leaflets 162 may also include a graft material. The graft material may be a natural or biological material such as pericardium or another membranous tissue such as intestinal submucosa. Alternatively, the graft material may be a low-porosity woven fabric, such as polyester, Dacron fabric, or PTFE, which creates a one-way fluid passage when attached to the stent. In one embodiment, the graft material may be a knit or woven polyester, such as a polyester or PTFE knit, which can be utilized when it is desired to provide a medium for tissue ingrowth and the ability for the fabric to stretch to conform to a curved surface. Polyester velour fabrics may alternatively be used, such as when it is desired to provide a medium for tissue ingrowth on one side and a smooth surface on the other side. These and other appropriate cardiovascular fabrics are commercially available from Bard Peripheral Vascular, Inc. of Tempe, Ariz., for example.

Figure 6:
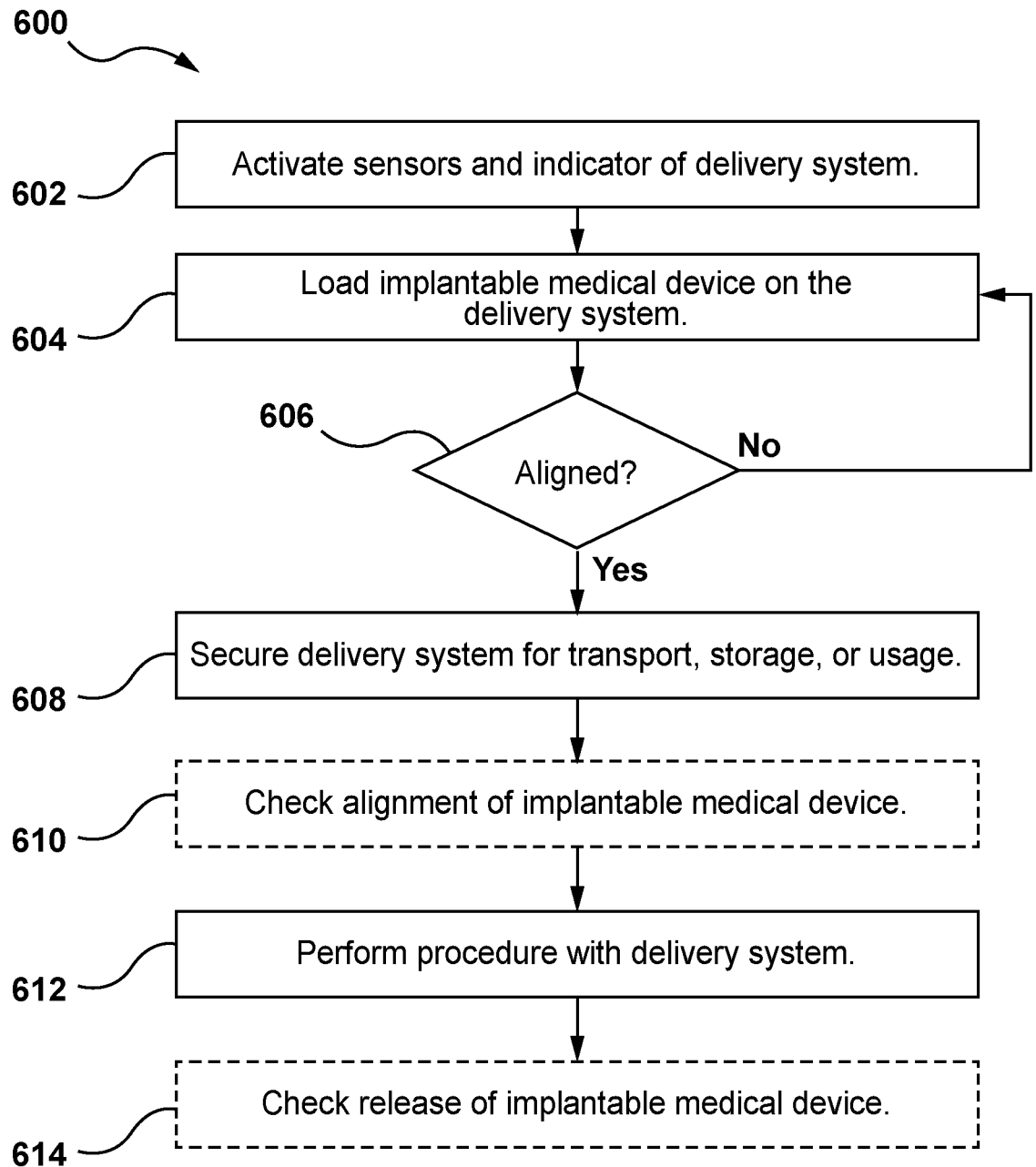
FIG. 6 depicts a flow of operations of the prosthesis delivery system of FIGS. 1A-1E, according to an embodiment hereof.

FIG. 6 illustrates a method 600 of operating the prosthesis delivery system 100 including the sensors 122 in accordance with an embodiment hereof. One skilled in the art will realize that FIG. 6 illustrates one example of steps that can be performed and that existing steps illustrated in FIG. 6 may be removed and/or additional steps may be added to the method 600.

In step 602, at the time of loading the implantable medical device 150, the sensors 122 and the indicator 124 of the prosthesis delivery system 100 can be activated. In embodiments, a user of the prosthesis delivery system 100 can activate the sensors 122 and the indicator 124 utilizing an activation device on the handle 104.

In step 604, the implantable medical device 150 can be loaded on the delivery catheter 102. During loading, in step 606, the indicator 124 can be monitored to determine if the implantable medical device 150 is properly aligned. For example, as illustrated in FIG. 1A, the indicator 124 can be a visual indicator that includes a red light and a green light. When the sensors 122 and the indicator 124 are activated, the indicator 124 can display either a red light that indicates improper alignment or a green light that indicates proper alignment, e.g., the paddles 152 being within the pockets 120.

During loading, when the paddles 152 are not within the pockets 120, the sensor 122 provides a signal to the indicator 124 representing the absence of the paddles 152, and, in response, the indicator 124 displays a red light. If the paddles 152 are within the pockets 120, the sensor 122 provide a signal to the indicator 124 representing the presence of the paddles, and, in response, the indicator 124 displays a green light. The user can determine that the implantable medical device is properly loaded when the indicator 124 displays the green light.

In step 608, the prosthesis delivery system 100 can be secured for transport, delivery, and/or usage. In step 610, the alignment of the implantable medical device 150 can optionally be checked prior to performing a procedure. As described above, the sensors 122 and the indicator 124 of the prosthesis delivery system 100 can be activated. A user (e.g., physician) of the prosthesis delivery system 100 can activate the sensors 122 and the indicator 124 utilizing an activation device on the handle 104. The indicator 124 can be monitored to determine with the implantable medical device 150 is properly aligned.

In step 612, a procedure can be performed with the prosthesis delivery system 100. In step 614, the release of the implantable medical device 150 can be checked. Similar to checking the alignment, the sensors 122 and the indicator 124 of the prosthesis delivery system 100 can be activated. A user (e.g., physician) of the prosthesis delivery system 100 can activate the sensors 122 and the indicator 124 utilizing an activation device on the handle 104. The indicator 124 can be monitored to determine with the implantable medical device 150 is released.

For release, the user can monitor the indicator 124 to determine when the paddles 154 are no longer present in the pockets 120, thereby indicating a release of the implantable medical device 150. For example, when the paddles 152 are not within the pockets 120, the sensor 122 provides a signal to the indicator 124 representing the absence of the paddles 152, and, in response, the indicator 124 displays a red light. The user can utilize the red light to signal a release of the implantable medical device.

The sensors 120 and the indicator 124 allows the loading of the implantable medical device 150 to be confirmed without using an imaging device (e.g., fluoroscope) to view the delivery catheter 102 and the implantable medical device 150 during loading or at the location prior to performing a procedure. As such during loading or procedure (e.g., the time of implantation), a doctor or other technician may confirm the correct loading of the implantable medical device 150 and/or identify a mis-load without the requirement of specialized training Likewise, the doctor or other technician may confirm the proper release of the implantable medical device 150 using the sensors 120 and the indicator 124.

It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single device or component for purposes of clarity, it should be understood that the techniques of this disclosure may be performed by a combination of devices or components associated with, for example, a medical device.

What is claimed is:

1. A delivery system for delivering a prosthesis, the delivery system comprising:
    a spindle for securing a stent of the prosthesis to a shaft, the spindle comprising at least one pocket for receiving a paddle of the stent; and
    at least one sensor positioned within the at least one pocket and configured to detect a presence of the paddle relative to the at least one pocket.

2. The delivery system of claim 1, the delivery system further comprising:
    at least one indicator coupled to the at least one sensor, wherein the at least one indicator outputs an indication of relative position of the paddle to the at least one pocket.

3. The delivery system of claim 2, wherein the indication output by the at least one indicator confirms that the paddle is properly positioned within the at least one pocket.

4. The delivery system of claim 3, wherein the indication is at least one of a visual indication or an audio indication.

5. The delivery system of claim 1, wherein the at least one sensor comprises a capacitive sensor, wherein a proximity of the paddle to the sensor causes a change in a capacitance in the capacitive sensor.

6. The delivery system of claim 1, wherein the at least one sensor comprises a force sensor that detects a force applied to the at least one pocket by the paddle.

7. The delivery system of claim 1, wherein the at least one sensor comprises an electrical circuit, wherein contact between the paddle and completes the electrical circuit.

8. The delivery system of claim 1, the delivery system further comprising:
    at least one additional sensor positioned within an outer surface of the spindle and configured to detect a presence of the paddle relative to the outer surface.

9. The delivery system of claim 1, the delivery system further comprising:
    at least one additional sensor positioned on an outer surface of the spindle and configured to detect a presence of the paddle relative to the outer surface.

10. A delivery system for delivering a prosthesis, the delivery system comprising:
    a shaft for delivering the prosthesis to a target site;
    a spindle coupled to the shaft for securing a stent of the prosthesis to the shaft, the spindle comprising at least one pocket for receiving a paddle of the stent;
    a sheath covering the stent and spindle, wherein the sheath is configured to move relative to the shaft; and at least one sensor positioned within the at least one pocket and configured to detect a presence of the paddle relative to the at least one pocket.

11. The delivery system of claim 10, the delivery system further comprising:
at least one indicator coupled to the at least one sensor, wherein the at least one indicator outputs an indication of relative position of the paddle to the at least one pocket.

12. The delivery system of claim 11, wherein the indication output by the at least one indicator confirms that the paddle is properly positioned within the at least one pocket.

13. The delivery system of claim 12, wherein the indication is at least one of a visual indication or an audio indication.

14. The delivery system of claim 10, wherein the at least one sensor comprises a capacitive sensor, wherein a proximity of the paddle causes a change in a capacitance in the capacitive sensor.

15. The delivery system of claim 10, wherein the at least one sensor comprises a force sensor that detects a force applied to the at least one pocket by the paddle.

16. The delivery system of claim 10, wherein the at least one sensor comprises an electrical circuit, wherein contact between the paddle completes the electrical circuit.

17. The delivery system of claim 10, the delivery system further comprising:
at least one additional sensor positioned within an outer surface of the spindle and configured to detect a presence of the paddle relative to the outer surface.

18. The delivery system of claim 10, the delivery system further comprising:
at least one additional sensor positioned on an outer surface of the spindle and configured to detect a presence of the paddle relative to the outer surface.

19. A method for determining proper loading of an implantable medical device coupled to a spindle of a delivery system, the method comprising:
activating one or more of at least one sensor or at least one indicator, wherein the at least one sensor is positioned within a pocket of the spindle and configured to detect a presence of a paddle of the implantable medical device relative to the pocket; and
in response to the activation, outputting, via the at least one indicator, an indication of relative position of the paddle to the pocket.

20. The method of claim 19, wherein the indication output by the at least one indicator confirms that the paddle is properly positioned within the pocket.

* * * * *